(12) United States Patent
Yabuki et al.

(10) Patent No.: US 6,177,195 B1
(45) Date of Patent: Jan. 23, 2001

(54) DEFORMED FIBER

(75) Inventors: Masuo Yabuki, Kurashiki; Masanobu Sakamoto, Tokyo, both of (JP)

(73) Assignee: Hagihara Industries Inc., Okayama (JP)

( * ) Notice: Under 35 U.S.C. 154(b), the term of this patent shall be extended for 0 days.

(21) Appl. No.: 09/346,236

(22) Filed: Jul. 1, 1999

(30) Foreign Application Priority Data

Jul. 10, 1998 (JP) .................................................. 10-196281

(51) Int. Cl.[7] ........................................................ D01F 6/00
(52) U.S. Cl. ............................................ 428/399; 428/357
(58) Field of Search ..................................... 428/357, 399, 428/292.7, 298.1; 57/206, 241, 242

(56) References Cited

U.S. PATENT DOCUMENTS

| | | | |
|---|---|---|---|
| 3,251,181 | * 5/1966 | Breen et al. ........................... | 428/395 |
| 4,016,329 | * 4/1977 | Matsuyma et al. ................... | 428/375 |
| 4,059,950 | * 11/1977 | Negishi et al. ....................... | 428/399 |
| 4,330,591 | * 5/1982 | Blackmon et al. ................... | 428/394 |
| 4,419,313 | * 12/1983 | Bromley et al. ...................... | 428/399 |
| 4,489,543 | * 12/1984 | Bromley et al. ...................... | 428/399 |
| 4,661,404 | * 4/1987 | Black .................................... | 428/399 |

* cited by examiner

*Primary Examiner*—Newton Edwards
(74) *Attorney, Agent, or Firm*—Koda & Androlia

(57) ABSTRACT

Deformed fiber which is either a long fiber prepared by such a manner that plural parallel yarns are unified by formation of connecting parts at appropriate intervals on the longitudinal direction of yarn or particularly a short fiber prepared by cutting the above wherein the plural parallel yarns of filaments are spun from a thermoplastic resin for obtaining the deformed fiber which is effective as pile yarn or gas permeating woven fabric having a specific shape or as fiber for reinforcement of cement for improving tensile strength, bending strength, shock resistance, crack resistance, etc. of molded cement product by improving the working ability and reinforcing property as a result of compounding the short fiber prepared by cutting the deformed fiber with hydraulic substance such as concrete or mortar as a material for public works or buildings.

4 Claims, 4 Drawing Sheets

(3 of 4 Drawing Sheet(s) Filed in Color)

DEFORMED FIBER

BACKGROUND OF THE INVENTION

1. Field of the Invention

The present invention relates to a deformed fiber which is a fiber spun from thermoplastic resin and is characterized in its specific shape where the filaments arranged in parallel are basic elements. More particularly, it relates to a deformed fiber which improves the applying and reinforcing properties of molded cement product by compounding with a hydraulic substance such as concrete and mortar as materials for public works and buildings whereby fiber for reinforcement of cement improving tensile strength, bending strength, shock resistance, cracking resistance, etc. can be prepared.

2. Prior Art

Synthetic fiber having modified cross section and uneven surface has been used in many fields for each of their purposes.

For example, pile yarn having modified cross section has been developed for artificial grass. However, monofilament and flat yarn having smooth surface have significant difference from natural grass due to their poor recovery from pressing bend and strong surface gloss and have disadvantages that they are not suitable as artificial grass. Pile yarn having modified cross section has been developed for solving such a disadvantage.

In various basic material sheets consisting of laminated sheet of textile and film, they are woven from a drawn yarn of modified shape having groove-like uneven surface so that laminated resin is invaded into spaces of the groove-like uneven surface to give a strong thermal fusion.

Besides the above, adhesive sheets where multifilament with many surface undulations and split yarn with naps are used as basic material whereby adhesion is improved and tufted products where lined latex is used together for strong unification have been available. As such, there have been many attempts in which modified cross section or surface undulation of synthetic fiber are utilized.

In addition, when deformed fiber which is cut in a short size is accumulated followed by bonding to give felt or nonwoven fabric, both flexibility and thermal fusion are improved and suppression of detachment of fiber can be expected and, therefore, deformed fiber is used as short fiber. Among various uses of deformed short fiber, the use as a fiber for reinforcement of cement by compounding with hydraulic substance such as concrete and mortar has been receiving public attention. Its background will be explained as hereunder.

Molded cement products using conventional concrete or mortar and cement constructions such as outer wall of buildings, inner wall of tunnels, inclined surface, etc. are relatively fragile as molded products. Especially, their physical properties such as tensile strength, bending resistance, bending toughness, etc. are insufficient and there are risks that the molded product shows cracks and is broken or that leakage of water or exfoliation takes place whereby many problems in terms of safety control have been pointed out.

In order to solve such problems, many molded cement products are reinforced by iron rods. However, there is a problem that transportation and assembling of iron rods increase cost for materials and for labor. Therefore, reinforcing means where less expensive fiber materials such as steel fiber, glass fiber, aramid fiber, carbon fiber and synthetic fiber are compounded with concrete instead of iron rods have been conducted.

Steel fiber is strong, has a high Young's modulus and is easily compatible with cement. In addition, there has been a proposal (U.S. Pat. No. 5,451,471) where V-shaped notches and grooves are formed on the steel fiber or the fiber is deformed near both ends so as to improve the adhesion to cement. However, since specific gravity of steel fiber is as high as 7.8, transportation and mixing work of the material are difficult. Further, there is a possibility that workers have their feet pricked by the steel fiber scattered around there upon application causing an injury. There is another problem that generation of rust lowers the reinforcing effect or deteriorates the beautiful appearance.

Although glass fiber uses an alkali-resistant glass, there is still a problem in durability and there is a disadvantage that the fiber is apt to be broken upon kneading with cement. In addition, fibers are apt to be tangled each other and a special kneader is necessary so as to form no fiber ball. Disadvantage of aramid fiber and carbon fiber is that they are expensive.

Unlike the glass fiber, synthetic fiber represented by resin of a polyvinyl alcohol type and a polypropylene type is less expensive, light in weight and strong and has a good handling property. However, it has a poor compatibility with cement and there is a problem that severe spots are apt to be generated on the molded cement product. In addition, short fiber in a simple shape has a disadvantage that it is apt to be dropped out from the molded cement product by bending stress and its reinforcing effect is not sufficient.

Therefore, many methods have been proposed where the short fiber shape of synthetic fiber for reinforcement of cement is improved to reduce the dropping out from molded cement product achieving a sufficient reinforcing effect. For example, short fiber consisting of elongated polyolefin tape where undulation is formed on the surface by an embossing treatment (Japanese Patent Laid-Open No. 116297/1999), short fiber prepared by elongation together with giving undulation thereto upon spinning, short fiber where nearly spiral projections are formed on the fiber surface and short fiber consisting of cleaved fiber of polypropylene film are available.

However, any of the above-mentioned disclosed art is insufficient. For example, in the deformed fiber where surface and cross section of the fiber are irregularly changed, it is difficult to keep a stable quality upon a continuous production. In addition, many disadvantages in the manufacture such as that productivity is poor because of difficulty in uniform spinning and winding, that conditions for production such as temperature setting upon extrusion and elongation are severe and that devices for the production are specific have been pointed out.

Further, modified polyolefin has been proposed for improving the adhesion of polyolefin short fiber to cement. For example, modification using a reactive silicon (Si(IV) moiety) is proposed in U.S. Pat. Nos. 4,710,540 and 4,952,631. However, it is inevitable that the chemical modification of polyolefin results in a high cost as compared with multipurpose polyolefin.

SUMMARY OF THE INVENTION

In order to solve the problems in the conventional deformed fiber and deformed short fiber as mentioned above, an object of the present invention is to offer deformed long fiber and deformed short fiber in a low cost which is composed of thermoplastic resin of a common commercial base and is capable of ensuring the stable quality in a continuous production.

The first feature of the present invention is a deformed fiber consisting of long fiber where parallel yarns consisting of plural filaments spun from a thermoplastic resin are unified by means of connecting parts formed with appropriate intervals to the longitudinal direction of the yarn.

The second feature of the present invention is a deformed fiber where short fiber is prepared from the parallel yarns in which most of them have plural connecting parts.

The third feature of the present invention is a deformed fiber where the above deformed short fiber is advantageously used as a fiber for reinforcement of cement.

To be more specific, the present invention relates to a deformed fiber where parallel yarns consisting of 2–5 filaments of a single yarn fineness of 500–5,000 deniers spun from a thermoplastic resin are unified by means of connecting parts formed with intervals of 1–30 mm on a longitudinal direction of the yarn to give a fiber of total fineness of 2,000–12,000 deniers and the resulting fiber wherein most of the parallel yarns still have plural connecting parts is made into a short fiber within a fiber length range of 5–100 mm. The thermoplastic resin which is advantageously used here is a polypropylene resin having an isotactic pentad rate of not less than 0.95 and melt flow rate of 0.1–50 g/10 minutes.

BRIEF DESCRIPTION OF THE DRAWINGS

The claim of this patent contains at least one drawing executed in color.

DETAILED DESCRIPTION OF THE INVENTION

There is no limitation for the thermoplastic resin giving the deformed fiber of the present invention so far as it is a resin which can be spun. Its examples are polyolefin resins such as linear low-density polyethylene, medium-density polyethylene, high-density polyethylene, polypropylene, polybutene-1, poly-4-methylpentene-1, ethylene-vinyl acetate copolymer, ethylene-ethyl acrylate copolymer, polyolefin modified with maleic acid anhydride and ethylene-propylene copolymer, polyvinyl chloride, polystyrene, polyester, polyamide and polyvinyl alcohol. Each of the above-mentioned thermoplastic resins may be compounded with various additives such as antioxidant, lubricant, ultraviolet absorber, antistatic agent, inorganic filler, organic filler, cross-linking agent, foaming agent and nucleic agent depending upon the object of use of the fiber.

Figure 1:
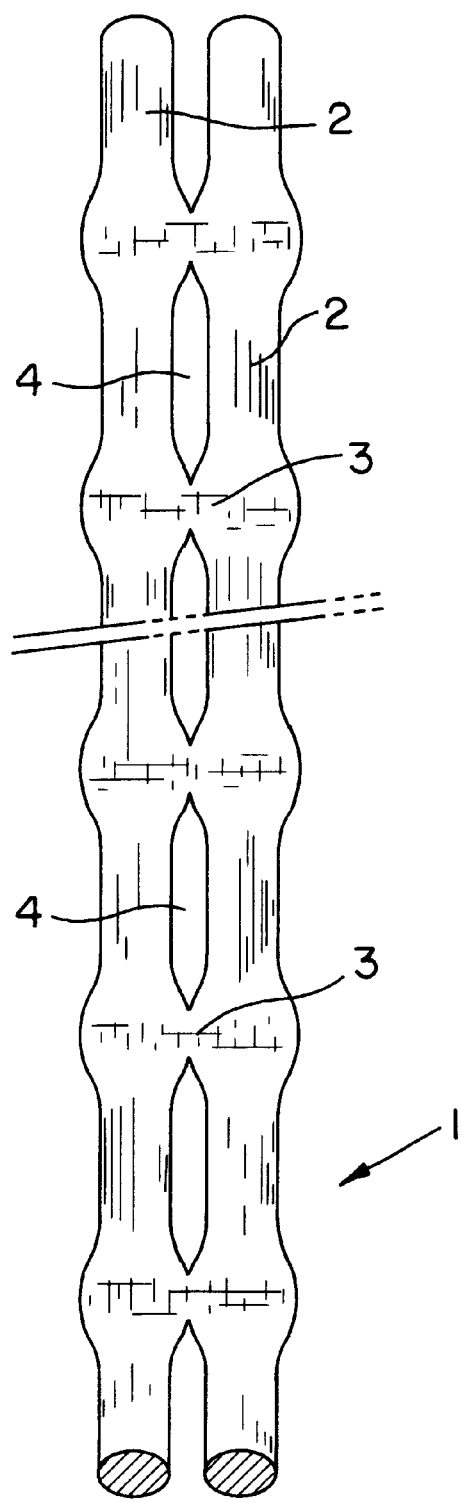
FIG. 1 is a drawing which shows the deformed fiber of the present invention schematically and is a plane figure of an example consisting of two parallel yarns.

The deformed fiber of the present invention has a characteristic in its shape. As one of the examples, the deformed fiber 1 of the most basic two parallel yarns is shown in FIG. 1. The first characteristic feature of this deformed fiber 1 is that plural filaments 2 are in a parallel state. The second characteristic feature is that a unified fiber is formed by a partial connection at connecting parts 3 of the adjacent filaments 2. Connection of the filaments 2 with appropriate intervals by means of the connecting parts 3 expands the surface area as the deformed fiber and forms undulation on the fiber surface. Due to such characteristic features, deformed fiber which can be used in various uses is prepared.

For example, when this deformed fiber is used as pile yarns for artificial grass, light is irregularly diffused on the fiber surface to suppress the gloss of the surface whereby an appearance similar to natural grass is achieved. In addition, woven cloth consisting of the deformed fiber has a good compatibility with coated/adhered laminated resin or latex whereby a strong adhesion is achieved. Further, as shown in FIG. 1, the unified filaments 2 have gaps 4 in addition to the connected parts 3. Therefore, the woven cloth in which this deformed fiber is incorporated has a high strength and the gaps 4 become aeration pores. As a result, it can be used for filters, agricultural coating materials, etc. where an appropriate gas permeability is requested.

As hereunder, method for the manufacture of the deformed fiber of the present invention will be illustrated. However, the gist of the present invention is in a specific shape of the deformed fiber and, therefore, the present invention is not limited to the following manufacturing method.

Firstly, the above-mentioned thermoplastic resin which is poured into an extruder together with additives if necessary is extruded from plural nozzles in a heated and melted state, cooled, subjected to a longitudinal uniaxial elongation to an extent of about 3- to 15-fold by a heating elongating machine such as a hot roll type, a hot plate type and a hot-air oven type and then subjected to a relaxation treatment to spin into parallel yarns having high rigidity, high strength and low elongation.

The parallel yarns may be in such a state that plural filaments 2 are aligned and it is not necessary to be completely separated or spaced. The term parallel yarns also cover connected yarns where a part of the adjacent filaments having more undulations than the yarns in a simple shape are adhered. Therefore, the nozzle hole of each nozzle may be separated each other and arranged in parallel or a part of the adjacent nozzle holes may be connected. Even if the adjacent filaments are adhered to give connected yarns at the stage before elongation, that is an adhesion at the part where the thickness is thin and the thermal elongation takes place highly to the longitudinal direction whereby an orientation is given and the product is apt to be cracked to the longitudinal direction. In addition, the filaments in a connected yarn can be separated by breaking into a single yarn filament by a step where outer force such as formation of connecting part which will be mentioned later. Unless the plural nozzles in parallel are made in a specific positional relation or shape, it is easy to make the filaments in a connected yarn into a single yarn. Shape of the nozzle may be not only in circle or ellipse but also in polygon such as triangle and tetragon and other irregular shape such as Y-shape or star-shape.

After that, partial connecting parts 3 are formed in the parallel yarns and plural filaments are made into one single fiber. The connecting parts 3 may be formed by a method where other materials such as adhesive and binder are applied to the filament followed by drying. However, in such a method, treating steps are complicated and production speed is not high whereby that is less practical. Appropriate methods are that where bar, plate, roll, etc. in which the surface is made uneven by means of engraving are pushed with heating or the filament is sandwiched by them and that where the filament is crushed and the spread area is subjected to a thermal adhesion to form a connecting part 3. The above methods are the applicable art and that is because the filament 2 is a thermoplastic resin. The use of emboss roll is particularly effective because the connecting parts 3 can be formed quickly and in a stable manner. The connecting parts 3 suppress the isolation of the parallel yarns and, at the same time, form the undulations on the fiber surface. Thus, the parallel yarns themselves result in undulations to the direction of width of the fiber while the connecting parts 3 result in undulations to the direction of length of the fiber.

The deformed fiber 1 consisting of such a fiber can be used as fiber for weaving/knitting and as pile fiber in a normal state or in a crimped or twisted state. Further, it can be cut by a roller cutter or a straw cutter to cut the fiber length into a short size and the resulting one can be used as a short fiber. This deformed short fiber can be used as a material for felt or nonwoven fabric as a fiber web. It is particularly effective as a fiber for reinforcement of cement. The deformed short fiber of the present invention used as a fiber for reinforcement of cement will be explained as hereunder.

The deformed short fiber of the present invention which is used as a fiber for reinforcement of cement may use the above-mentioned resin or the like which can be fusion molded to thermoplastic resin. Polypropylene resin having high crystallinity, high rigidity and easy molding property is particularly preferred.

The polypropylene resin used here means a homopolymer of propylene, known polypropylene copolymers such as ethylene-propylene block copolymer and random copolymer and a mixture thereof. Among them, a homopolymer of propylene is preferred for reinforcement of cement which is requested to exhibit high strength and thermal resistance. That which has an isotactic pentad rate of not less than 0.95 is particularly preferred. The isotactic pentad rate is a value measured by means of $^{13}$C-NMR reported by A. Zambelli, et al. in *Macromolecules*, 6, 925 (1973) and is an isotactic ratio in terms of a pentad unit in polypropylene molecule. The higher this value, the higher the crystallinity and, as a result, rigidity and thermal resistance of the molded product are improved. With regard to the melt flow characteristics of the resin, the melt flow rate (MFR) is selected from the range of 0.1–50 g/10 minutes, preferably 1–40 g/10 minutes or, more preferably, 5–30 g/10 minutes.

In the deformed short fiber used as a fiber for reinforcement of cement, it is preferred that each of the filaments which constitute the parallel yarns has a fineness of 500–5,000 deniers. As a reinforcing effect of the fiber for reinforcement of cement, it is generally expected that the initial elastic modulus of the fiber is 150–700 kg/mm$^2$. Fineness is settled from this viewpoint by taking the shape of fiber and the spinning property and the dispersing property in cement of the filament into consideration.

Appropriate intervals between the connecting parts are within a range of 1–30 mm. Thus, when the interval is less than 1 mm, the fiber is in a form of tape and the effect as parallel yarns is poor whereby the homogeneous dispersion in concrete is difficult while, when the interval is more than 30 mm, an adhesive force of the short fiber is low, isolation of filament is apt to take place and the effect of reinforcing the cement, particularly the effect against pulling out of fiber, is poor.

In the deformed short fiber, the filaments are in parallel and the fiber consists of at least two filaments although the upper limit of the numbers of the parallel yarns are about five. This upper limit is closely related to the fineness of the filament of the above-mentioned single yarn. In the deformed short fiber where many filaments of low fineness are aligned in parallel, the initial elasticity is low and enlargement of the undulations on the surface cannot be expected. On the other hand, filament of high fineness has a poor productivity and there is a problem in handling such as worsening of dispersibility upon compounding with cement. Therefore, the total fineness of the parallel yarns is preferably 2,000–12,000 deniers. Thus, when the total fineness is less than 2,000 deniers, handling as a fiber for reinforcement of cement is poor while, when it is more than 12,000 deniers, fiber blocks are formed upon compounding with cement resulting in bad dispersion whereby the reinforcing effect for molded cement product is not well achieved. However, in the use other than for the fiber for reinforcement of cement, the fiber is not limited to the above-mentioned conditions.

Fiber length of the deformed short fiber is to be 5–100 mm or, more preferably, 15–80 mm. Thus, when the fiber length is shorter than 5 mm, detachment from the compounded cement is apt to take place while, when it is longer than 100 mm, dispersibility is poor and that is not preferred. When the fiber length is within the above-mentioned range, most of the short fiber is present in a state of parallel yarn having plural connections and that is suitable as a fiber for reinforcement of cement.

The deformed fiber of the present invention can be applied with various treatments before and after cutting the molded fiber. For example, surface-active agent, dispersing agent, coupling agent, etc. may be applied on the fiber surface or corona discharge, irradiation with ultraviolet rays, irradiation with electron beam, etc. may be conducted to activate or cross-link the surface. The deformed short fiber is compounded with a hydraulic substance such as Portland cement, white Portland cement, alumina cement, gypsum and lime and is used as a material for public works and for constructions.

EXAMPLES 1–7

Polypropylene resin (isotactic pentad rate: 0.96: MFR= 5.0 g/10 minutes; Tm=163° C.) (100 parts by weight) was compounded with 1 part by weight of pigment of a gray type and 2 parts by weight of ultraviolet absorber. The mixture was poured into an extruder and extruded from dice having a lip where two nozzle pores were placed in parallel. The extruded material was cooled, subjected to a uniaxial longitudinal elongation by a hot-air oven elongating machine to an extent of 9.2-fold and subjected to a releasing treatment to give parallel yarns of total fineness of 6,400 deniers consisting of two flat monofilaments having a single yarn fineness of 3,200 deniers.

Figure 2:
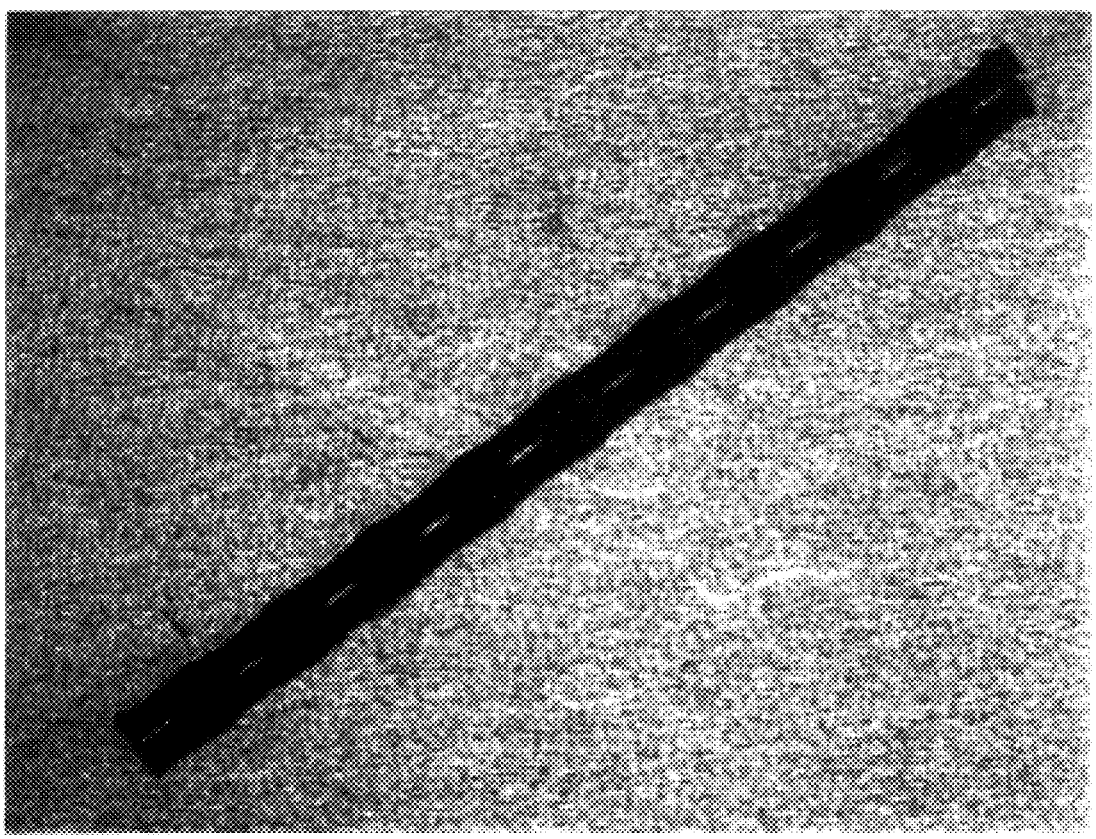
FIG. 2 is a microscopic picture (×10) of the deformed fiber consisting of two parallel yarns produced in Example 1.
Figure 3:
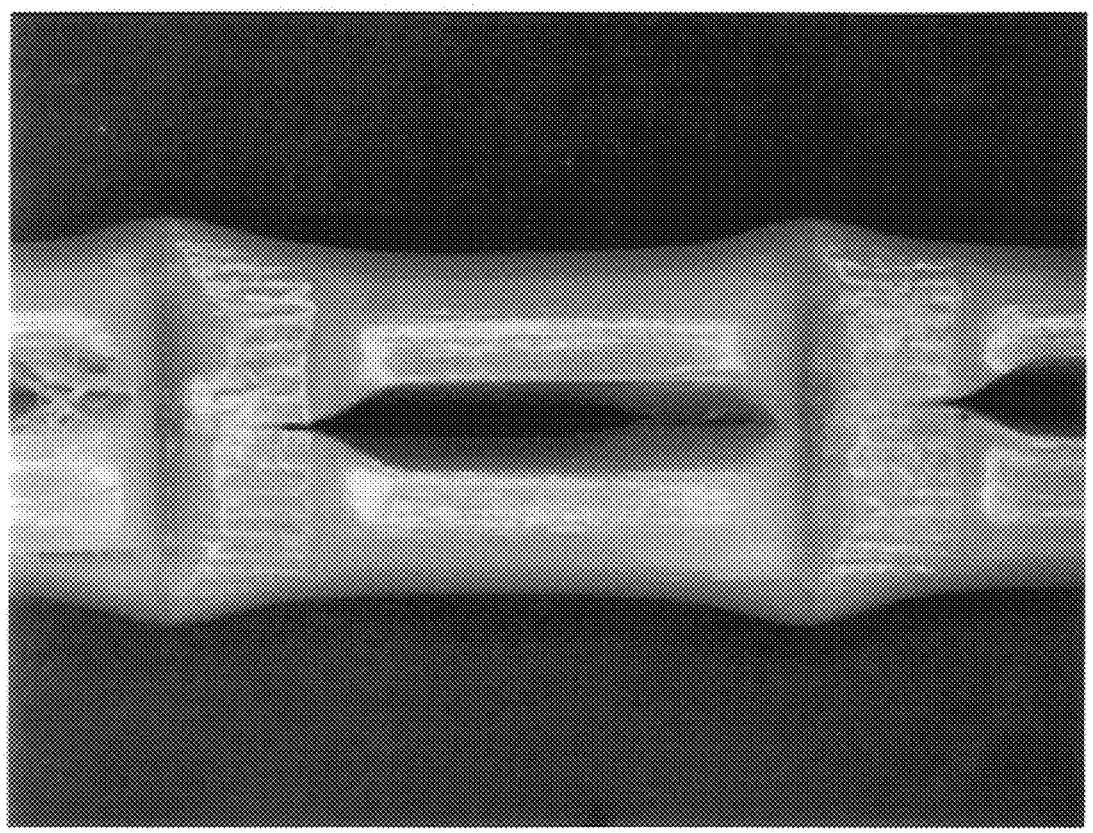
FIG. 3 is a microscopic picture (×50) of the deformed fiber consisting of two parallel yarns produced in Example 1.
Figure 4:
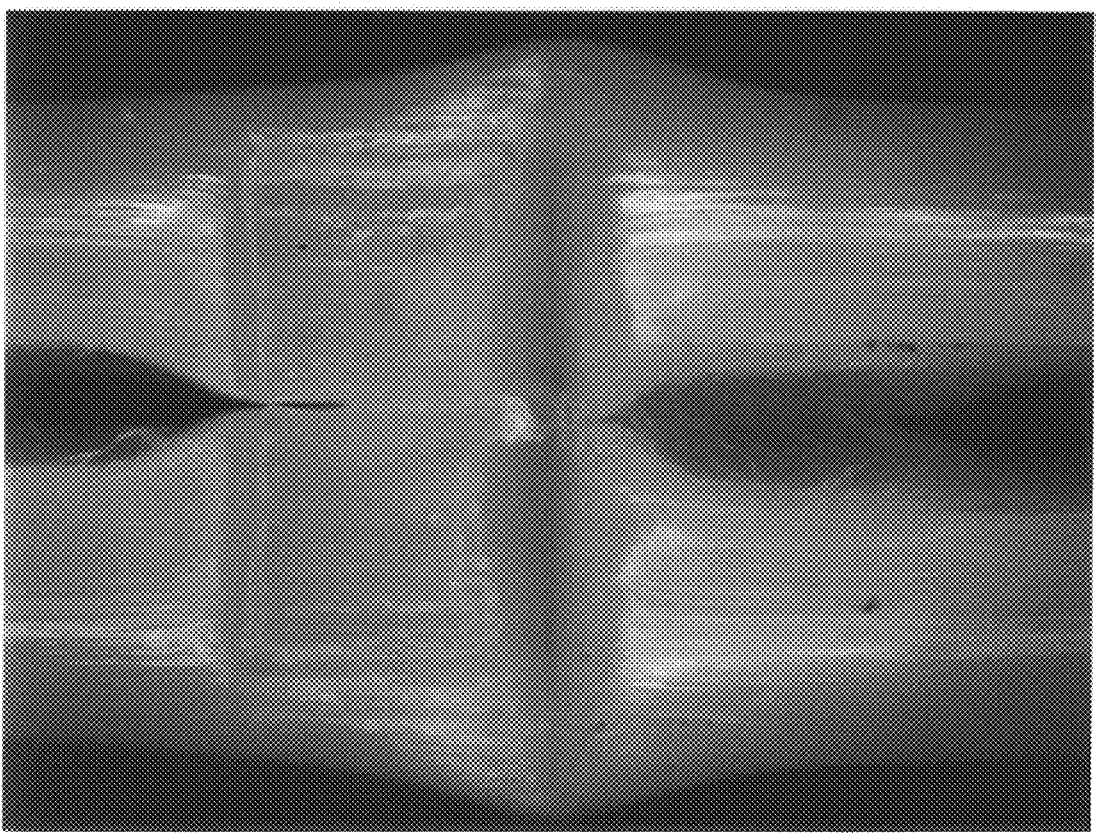
FIG. 4 is a microscopic picture (×100) of the deformed fiber consisting of two parallel yarns produced in Example 1.

The parallel yarns were sent by in-line to a striped metal roll and made into a predetermined shape by means of an embossing process with compression and heating. As a result, the parts where width is expanded were heat-fused to give connecting parts. After that, parallel yarns were dipped in an aqueous surfactant solution in which 50 parts by weight of polyoxyalkylene alkyl phenyl ether phosphate (HLB=9) and 50 parts by weight of polyoxyalkylene fatty acid ester (HLB=12) were mixed. The dried parallel yarns were cut in a fiber size of 30 mm using a rotary cutter to manufacture a deformed short fiber of Example 1. Microscopic pictures of the fiber of Example 1 are shown in FIG. 2 (×10), FIG. 3 (×50) and FIG. 4 (×100). In the parallel monofilaments, formation of gaps of width of about 0.35 mm and length of about 2 mm was confirmed except at the connecting parts.

In Examples 2–7, the same materials and manufacturing method as in Example 1 were applied although fineness and numbers of monofilaments and fiber length were changed. In Comparative Examples, polypropylene fiber, Vinylon fiber and steel fiber in a common monofilament shape were selected and evaluated. Data for each of them are given in Table 1.

TABLE 1

| Items | Material | Shape | Total Fineness (Single Yarn Fineness) | Specific Gravity | Fiber Length |
|---|---|---|---|---|---|
| Example 1 | PP | 2 in parallel | 6,400 (3,200) deniers | 0.91 | 30 mm |
| Example 2 | PP | 2 in parallel | 6,400 (3,200) deniers | 0.91 | 15 mm |
| Example 3 | PP | 2 in parallel | 6,400 (3,200) deniers | 0.91 | 80 mm |
| Example 4 | PP | 2 in parallel | 3,200 (1,600) deniers | 0.91 | 30 mm |
| Example 5 | PP | 3 in parallel | 2,400 (800) deniers | 0.91 | 30 mm |
| Example 6 | PP | 3 in parallel | 9,600 (3,200) deniers | 0.91 | 30 mm |
| Example 7 | PP | 5 in parallel | 8,000 (1,600) deniers | 0.91 | 30 mm |
| Comp. Ex. 1 | PP | single yarn | 6,400 deniers | 0.91 | 30 mm |
| Comp. Ex. 2 | Steel | single yarn | 0.6 mm diameter | 7.8 | 30 mm |
| Comp. Ex. 3 | PVA | single yarn | 6,200 deniers | 1.3 | 30 mm |

Examples and Comparative Examples were evaluated as follows as fibers for reinforcement of cement. Each sample was prepared as follows. Thus, 100 parts of high-early-strength Portland cement, 220 parts of sand of standard roughness, 110 parts of broken stone and 60 parts of tap water were kneaded in a rotary drum mixer for about two minutes, 1% (by volume) of a deformed short fiber was added under stirring the mixer and the mixture was kneaded for one minute more and hardened by pouring into a mold to prepare a sample. The sample was evaluated in accordance with "Test Method for Compressive Strength and Compressive Toughness of Concrete Reinforced by Steel Fiber" regulated by the Japanese Society of Civil Engineering (JSCE G551-1983), "Test Method for Bending Strength and Bending Toughness of Concrete Reinforced by Steel Fiber" regulated by the Japanese Society of Civil Engineering (JSCE G552-1983), JIS-A1132 and JIS-A1106 and the result is given in Tables 2 and 3. Table 2 shows the relative comparison of reinforcing effect for concrete due to changes in diameter and length of fiber based upon the data for the short fiber prepared in Example 1. Table 3 shows the influence of fineness, fiber length, numbers of parallel yarns, etc. on physical property of cement in Examples 2–7 which are within the coverage of the present invention.

TABLE 2

| Evaluating Items | Compressing Strength (N/mm$^2$) | Tensile Strength (N/mm$^2$) | Bending Strength (N/mm$^2$) | Bending Toughness (N · mm) |
|---|---|---|---|---|
| Example 1 | 41.8 | 4.03 | 5.10 | 27.4 |
| Comp. Ex. 1 | 35.6 | 3.07 | 3.75 | 17.6 |
| Comp. Ex. 2 | 43.6 | 4.00 | 5.23 | 30.7 |
| Comp. Ex. 3 | 38.1 | 3.12 | 3.77 | 16.2 |

TABLE 3

| Evaluating Items | Compressing Strength (N/mm$^2$) | Tensile Strength (N/mm$^2$) | Bending Strength (N/mm$^2$) | Bending Toughness (N · mm) |
|---|---|---|---|---|
| Example 2 | 35.8 | 3.84 | 4.98 | 25.4 |
| Example 3 | 42.9 | 4.22 | 5.23 | 28.6 |
| Example 4 | 35.0 | 3.88 | 5.00 | 25.4 |
| Example 5 | 33.6 | 3.80 | 4.87 | 24.7 |
| Example 6 | 45.4 | 4.45 | 5.22 | 28.1 |
| Example 7 | 43.3 | 4.11 | 5.14 | 26.3 |

From the result of Table 2, far better reinforcing effect to cement was noted in Example 1 than the synthetic resin fiber in a conventional shape as shown in Comparative Examples 1 and 3. The effect is in such an extent that the effectiveness resulted by the deformed short fiber in a specific shape can be confirmed and is in such a high level as the steel fiber of Comparative Example 2 has. From the result of Table 3, there is a tendency that, in the case of a short fiber, the longer the fiber length or the more the total fineness, the better the reinforcing effect. In actual use, an appropriate selection is necessary depending upon the object and use of the molded cement product and applying method taking the homogeneous dispersibility with cement and the inconveniences such as resistance during the transportation by pipe into consideration. From the measured values in the Examples, it has been confirmed that, in various specifications, the short fiber of the present invention greatly improves the physical property of the molded cement product.

EXAMPLE 8

High-density polyethylene was poured into an extruder as a material and extruded from dice having a lip where three nozzle holes are placed in parallel. The extruded material was cooled, subjected to a uniaxial longitudinal elongation by a hot-air oven elongating machine to an extent of 7.5-fold and subjected to a releasing treatment to give parallel yarns of total fineness of 2,400 deniers consisting of three flat monofilaments having a single yarn fineness of 800 deniers.

The parallel yarns were sent by in-line to a striped metal roll and made into a predetermined shape by means of an emboss process with compression and heating. As a result, the parts where width is expanded were heat-fused to give a deformed fiber having connecting parts with 10 mm intervals. This deformed fiber was used as warps and woofs in a count of (15×15)/inch and woven into a plainly woven tissue and the resulting product was used as a net for prevention of sprinkling of the paint upon application. Undulation of the surface of the deformed fiber expanded the surface area of the fiber and improved the adhesion of mist. As a result, the product showed additional 20% or more mist-collecting effect as compared with the net where common monofilament was used.

EXAMPLE 9

The same operation as in Example 8 was conducted except that 2 parts by weight of a green pigment was compounded with 100 parts by weight of Nylon 6 resin to manufacture a deformed fiber consisting of three parallel yarns. Then this deformed fiber was planted on a tufted cloth as a cut pile to prepare an artificial grass where the back surface was processed with latex. The resulting artificial grass showed so good compatibility between the latex with the roots of piled yarns at the back surface of the tufted cloth that they were strongly adhered and unified. In addition, the artificial grass which was placed outdoor showed a good recovery after stepped-on pressure and the artificial grass was found to have a good appearance where artificial gloss was suppressed.

As illustrated hereinabove, the deformed fiber of the present invention has a specific shape where parallel yarns consisting of plural filaments are connected at the connecting parts having a predetermined intervals to a longitudinal direction of the fiber. Therefore, in terms of manufacture, parallel yarns spun from thermoplastic resin are the basic constitution and its manufacture is easy whereby the product can be manufactured in a low cost together with keeping the quality in the continuous production. In terms of use, undulations formed on the surface and spaces among the filaments make the surface area of the fiber bigger whereby compatibility with laminated resin or latex is good and a strong adhesion is now possible. Further, the use where the spaces in the deformed fiber function as aeration pores is possible and, therefore, the deformed fiber of the present invention can be used in various product forms.

Especially, the deformed short fiber prepared by cutting the above deformed fiber and used as a fiber for reinforcement of cement shows easy handling such as transportation and pouring due to its small specific gravity as compared with the frequently used steel fiber and is economical where the weight of the fiber compounded with cement in the same ratio by volume is small. In addition, in terms of reinforcement of cement, there are more undulations on the surface than the fiber in a simple shape and, accordingly, the uneven surface significantly improves a physical binding to concrete, etc. to prevent the separation of the material and to suppress the pulling-out of the fiber after hardening whereby the reinforcing effect in the same degree as in the case of steel fiber can be expected. Further, unlike the steel fiber, the possibility of punctured injury on the sole caused by the fallen fiber due to a rebound is little and beautiful appearance of concrete is not deteriorated due to no generation of rust. Thus, as a whole, the present invention is quite effective as a fiber for reinforcement of cement.

We claim:

1. A deformed yarn comprising at least two parallel yarns consisting of plural short filaments spun from a thermoplastic resin and a plurality of connecting parts formed between said parallel yarns at predetermined intervals in a longitudinal direction of the parallel yarns whereby said parallel yarns are unified by said connecting parts and wherein the deformed short yarn is used by mixing with cement mortar as a fiber for reinforcement of the cement mortar.

2. A deformed yarn according to claim 1, wherein the fiber for reinforcement of the cement mortar is a fiber of total fineness of 2,000–12,000 deniers, each of said parallel yarns consists of 2–5 filaments, each of the filaments has a fineness of 500–5,000 deniers, the predetermined interval for the connecting parts is 1–30 mm in a longitudinal direction of the deformed yarn and the filaments have a length within a range of 5–100 mm.

3. A deformed yarn according to claim 2, wherein the thermoplastic resin is a polypropylene resin that has an isotactic pentad rate of not less than 0.95 and a melt flow rate of 0.1–50 g/10 minutes.

4. A deformed yarn according to claim 1, wherein a length of said short filaments is longer than said predetermined interval.

* * * * *